(12) United States Patent
Allen, Jr. et al.

(10) Patent No.: US 10,343,856 B2
(45) Date of Patent: Jul. 9, 2019

(54) RECONFIGURABLE TAMPING SYSTEM

(71) Applicant: A. G. Stacker Inc., Weyers Cave, VA (US)

(72) Inventors: Clarence C. Allen, Jr., Mt. Crawford, VA (US); Eric Stempihar, Bridgewater, VA (US); Eric H. Crowe, Weyers Cave, VA (US); Samantha L. J. Armstrong, Churchville, VA (US); Kevin G. Gorby, Harrisonburg, VA (US); Micah C. Sundstrom, Staunton, VA (US)

(73) Assignee: A.G. STACKER INC., Weyers Cave, VA (US)

( * ) Notice: Subject to any disclaimer, the term of this patent is extended or adjusted under 35 U.S.C. 154(b) by 33 days.

(21) Appl. No.: 15/783,740

(22) Filed: Oct. 13, 2017

(65) Prior Publication Data

US 2018/0105371 A1 Apr. 19, 2018

Related U.S. Application Data (60) Provisional application No. 62/536,561, filed on Jul. 25, 2017, provisional application No. 62/408,633, filed on Oct. 14, 2016.

(51) Int. Cl.
| | | |
|---|---|---|
| *B65H 31/30* | (2006.01) | |
| *B65G 47/71* | (2006.01) | |
| *B65G 57/03* | (2006.01) | |
| *B65H 29/50* | (2006.01) | |
| *B65H 31/38* | (2006.01) | |
| *B65G 57/11* | (2006.01) | |

(52) U.S. Cl.
CPC ............. *B65G 57/03* (2013.01); *B65H 29/50* (2013.01); *B65H 31/38* (2013.01); *B65G 57/11* (2013.01); *B65G 2201/022* (2013.01); *B65H 2701/176* (2013.01)

(58) Field of Classification Search
CPC ............ B65H 31/38; B65H 2701/1762; B65H 31/24; B65H 2301/42172; B65H 31/3081; Y10S 414/114
See application file for complete search history.

(56) References Cited

U.S. PATENT DOCUMENTS

| | | | | |
|---|---|---|---|---|
| 2,517,388 | A * | 8/1950 | Daves ..................... | B65H 29/32 271/211 |
| 3,550,493 | A * | 12/1970 | Benbenek .............. | B65H 29/62 271/303 |
| 3,880,420 | A * | 4/1975 | Martin ................... | B65H 29/16 198/431 |
| 3,977,671 | A * | 8/1976 | Taylor ................... | B65H 29/18 271/221 |

(Continued)

*Primary Examiner* — Gregory W Adams
(74) *Attorney, Agent, or Firm* — J-TEK Law PLLC; Jeffrey D. Tekanic; Scott T. Wakeman (57) ABSTRACT

A sheet stacking system includes a main conveyor configured to carry sheets in a downstream direction, an accumulator section downstream of the main conveyor configured to receive the sheets from the main conveyor, at least one tamping plate in the accumulator section, and at least one linear motor connected to the at least one tamping plate. The at least one linear motor is configured to move the at least one tamping plate back and forth in a direction perpendicular to the downstream direction to tamp a stack of the sheets in the accumulator section.

18 Claims, 4 Drawing Sheets

(56) References Cited

U.S. PATENT DOCUMENTS

| | | | | |
|---|---|---|---|---|
| 4,222,697 A * | 9/1980 | Vits | ............... | B65H 31/32 |
| | | | | 271/218 |
| 5,026,249 A * | 6/1991 | Shill | ............... | B65H 29/242 |
| | | | | 198/458 |
| 6,234,473 B1 * | 5/2001 | Morgan | ............... | B65H 29/50 |
| | | | | 271/200 |
| 7,040,855 B2 * | 5/2006 | Schnurr | ............... | B23Q 7/103 |
| | | | | 414/789 |
| 7,104,747 B2 * | 9/2006 | Talken | ............... | B65H 29/50 |
| | | | | 198/592 |
| 8,511,679 B2 * | 8/2013 | Kimura | ............... | B65H 31/38 |
| | | | | 271/221 |
| 8,529,186 B2 * | 9/2013 | Klein | ............... | B65H 29/669 |
| | | | | 414/789.1 |
| 9,045,243 B2 * | 6/2015 | Brown | ............... | B65B 11/00 |
| 2007/0075481 A1 * | 4/2007 | Thelen | ............... | B65H 29/041 |
| | | | | 271/145 |
| 2012/0128461 A1 * | 5/2012 | Zampollo | ............... | B65B 25/141 |
| | | | | 414/788.9 |

* cited by examiner

RECONFIGURABLE TAMPING SYSTEM

CROSS-REFERENCE TO RELATED APPLICATIONS

The present application claims the benefit of U.S. Provisional Patent Application No. 62/536,561 filed Jul. 25, 2017, and the benefit of U.S. Provisional Patent Application No. 62/408,633 filed Oct. 14, 2016, and the contents of both provisional patent applications are hereby incorporated by reference.

TECHNOLOGICAL FIELD

The present disclosure is directed to a reconfigurable tamping system usable with a sheet stacking system, and, more specifically, to a reconfigurable tamping system having automatically and/or remotely positionable tamping elements.

BACKGROUND

Figure 1:
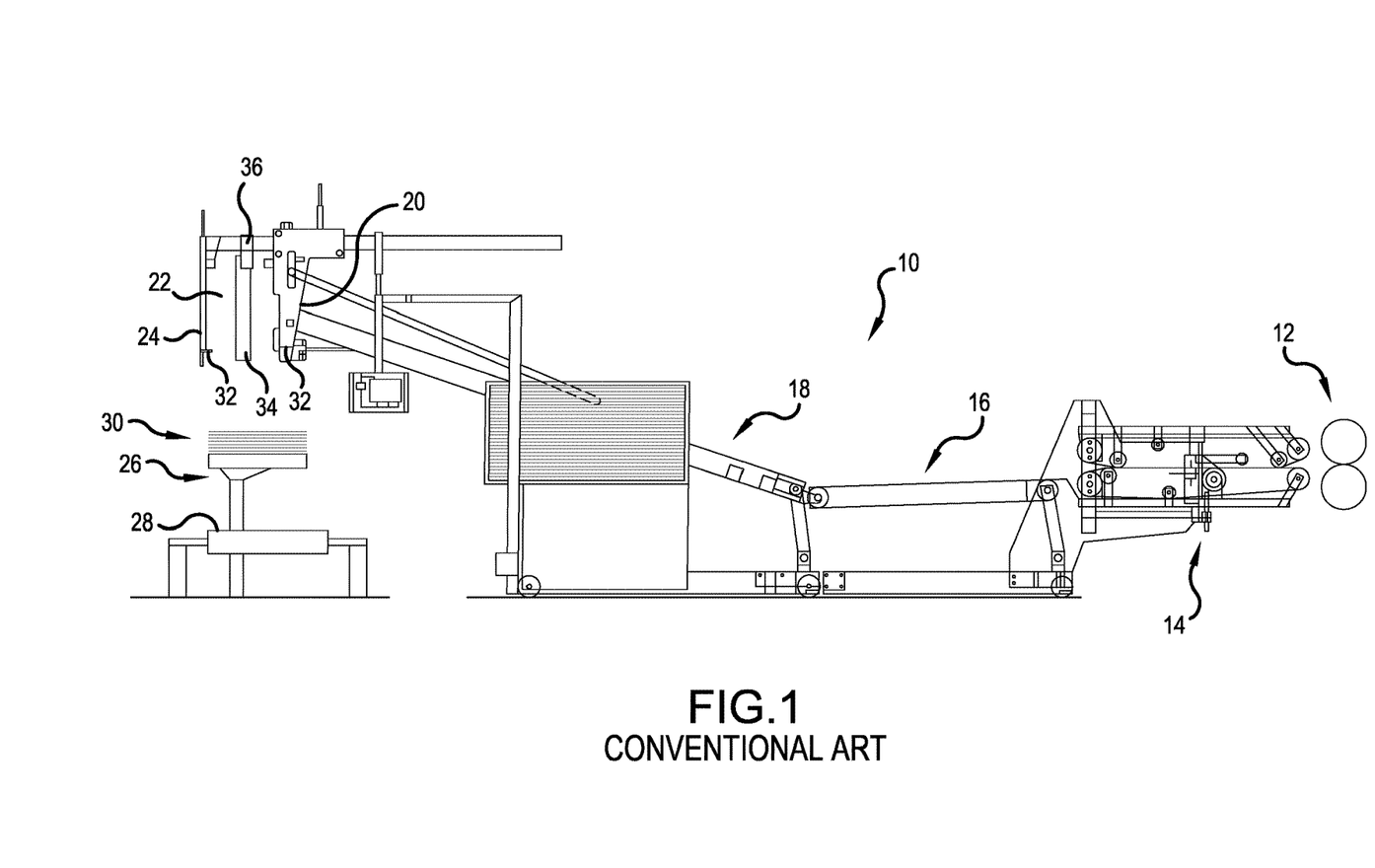
FIG. 1 is a side elevational view of a conventional stacking system that includes an accumulator.

A conventional stacking apparatus 10 is illustrated in FIG. 1. The stacking apparatus 10 is configured for use adjacent to a rotary die cut machine 12 which cuts blanks (not illustrated) from sheets of material, for example, corrugated paperboard. The stacking apparatus 10 includes a receiving or "layboy" section 14 that receives the blanks from the die cut machine 12 and discharges them onto a transfer conveyor 16. The transfer conveyor 16 carries the blanks to an inclined main conveyor 18, and the blanks travel along the main conveyor 18 to its downstream end 20 where they are discharged into a accumulator 22 (sometimes referred to as a "hopper").

After the blanks are discharged from the downstream end 20 of the stacker, they impact a backstop 24 that defines a downstream end of the accumulator 22 and fall onto a receiving conveyor 26 mounted on a lift table 28. Side tamping elements 34 mounted on an intermediate rail 36 and/or front and rear tamping elements (not illustrated), which may be pneumatically powered, for example, repeatedly press inwardly on the stack from opposite sides and/or from the front and the rear, to align or square the stack of sheets. As the stack 30 on the lift table 28 grows, the lift table 28 drops, either continuously or periodically, so that the sheets are always falling approximately the same distance from the downstream end 20 of the stacking apparatus 10 onto the lift table 28 or onto the partial stack 30 on the lift table 28. Alternately, the stack may fall onto a fixed-height conveyor and the end of the main conveyor may rise to maintain a constant distance from the top of the stack.

The position of the backstop 24 and the positions of the side tamping elements 34 are based on the size of the sheets to be processed and on the number of rows or streams of sheets that will be simultaneously discharged from the downstream end 20 of the stacking apparatus 10. The position of the backstop 24 is generally set manually before each product run by loosening fasteners (not illustrated) and manually sliding the backstop toward and away from the downstream end 20 of the stacking apparatus 10 until it is located at a suitable position for receiving incoming sheets, a position that is, for example, about 10% further from the downstream end 20 of the stacking apparatus 10 than the length of the sheets that will be received in the accumulator 22. The fasteners are then tightened to hold the backstop 24 at this position. Likewise, the connections of the side tamping elements 34 to the intermediate rail 36 are loosened, and the side tamping elements 34 are positioned as necessary for a given product run. The side tamping elements 34 are configured to move linearly back and forth a certain distance, one to two inches for example, and are therefore positioned such that, when this limited motion occurs, the side tamping elements will press inwardly against a stack of sheets to square the stack.

SUMMARY

It would be desirable to automate the positioning of the backstop and/or side tamping elements and to provide a greater degree of control over the tamping operation.

These benefits and others are provided by embodiments of the disclosed invention, a first aspect of which comprises a sheet stacking system that includes a main conveyor configured to carry sheets in a downstream direction, an accumulator section downstream of the main conveyor which is configured to receive the sheets from the main conveyor, at least one tamping plate in the accumulator section, and at least one linear motor connected to the at least one tamping plate. The at least one linear motor is configured to move the at least one tamping plate back and forth in a direction perpendicular to the downstream direction to tamp a stack of the sheets in the accumulator section.

Another aspect of the disclosure comprises a sheet stacking system that includes a main conveyor having an input end and a discharge end. The main conveyor is configured to carry at least one row of sheets in a first direction from the input end to the discharge end and to discharge the at least one row of sheets from the discharge end to form at least one stack of sheets. The main conveyor further includes a first side and a second side spaced from the first side in a second direction perpendicular to the first direction. An accumulator section is located downstream of the main conveyor discharge end and is configured to receive the at least one row of sheets on a support when the sheets are discharged from the discharge end of the main conveyor. The accumulator has a first side and a second side spaced from the first side in the second direction. A first side rail extends in the first direction along the first side of the accumulator section, and a second side rail extends in the first direction along the second side of the accumulator section, and an intermediate rail having first and second ends is slidably supported by the first and second side rails. A first linear motor is mounted on the intermediate rail and is configured to travel along the intermediate rail in the second direction and in a third direction opposite the second direction. A first tamping plate depends from the first linear motor into the accumulator section. The system also includes controller configured to move the first linear motor to a first predetermined position on the intermediate rail and to repeatedly move the first linear motor back and forth along the intermediate rail to cause the first tamping plate to perform a tamping operation on the at least one stack of sheets on the support in the accumulator section.

A further aspect of the disclosure comprises a method of operating a sheet stacking system that includes a main conveyor having an input end and a discharge end, the main conveyor being configured to carry at least a first row of sheets and a second row of sheets in a first direction from the input end to the discharge end and to discharge the first and second rows of sheets from the discharge end. The main conveyor also has a first side and a second side spaced from the first side in a second direction perpendicular to the first direction. The system includes an accumulator section downstream of the main conveyor discharge end that is configured to receive the first row of sheets in a first stack on a support and to receive the second row of sheets in a second stack on the support when the first and second rows of sheets are discharged from the discharge end of the main conveyor. The accumulator has a first side and a second side spaced from the first side in the second direction. A first side rail extends in the first direction along the first side of the accumulator section and a second side rail extends in the first direction along the second side of the accumulator section and an intermediate rail having first and second ends is slidably supported by the first and second side rail. A first linear motor is mounted on the intermediate rail and is configured to travel along the intermediate rail in the second direction and in a third direction opposite the second direction, and a second linear motor is mounted on the intermediate rail and is configured to travel along the intermediate rail in the second direction and the third direction. A first tamping plate depends from the first linear motor into the accumulator section, and a second tamping plate depends from the second linear motor into the accumulator section. A first drive is operably connected to the intermediate rail for moving the intermediate rail along the first and second side rails toward and away from the discharge end of the main conveyor, and a backstop plate is slidably supported on the first and second side rails such that the intermediate rail is located between the backstop plate and the discharge end of the main conveyor. A second drive is operably connected to the backstop plate for moving the backstop plate along the first and second side rails toward and away from the discharge end of the main conveyor. The method includes controlling the second drive to position the backstop plate at a first predetermined position, controlling the first drive to position the intermediate rail at a second predetermined position between the backstop plate and the discharge end of the main conveyor, controlling the first linear motor and the second linear motor to position the first tamping plate and the second tamping plate such that the first row of sheets will pass between the first tamping plate and the second tamping plate when the first row of sheets enters the accumulator section, and controlling the first linear motor and the second linear motor to move the first tamping plate and the second tamping plate toward and away from each other to tamp the stack of sheets.

DETAILED DESCRIPTION

Figure 2:
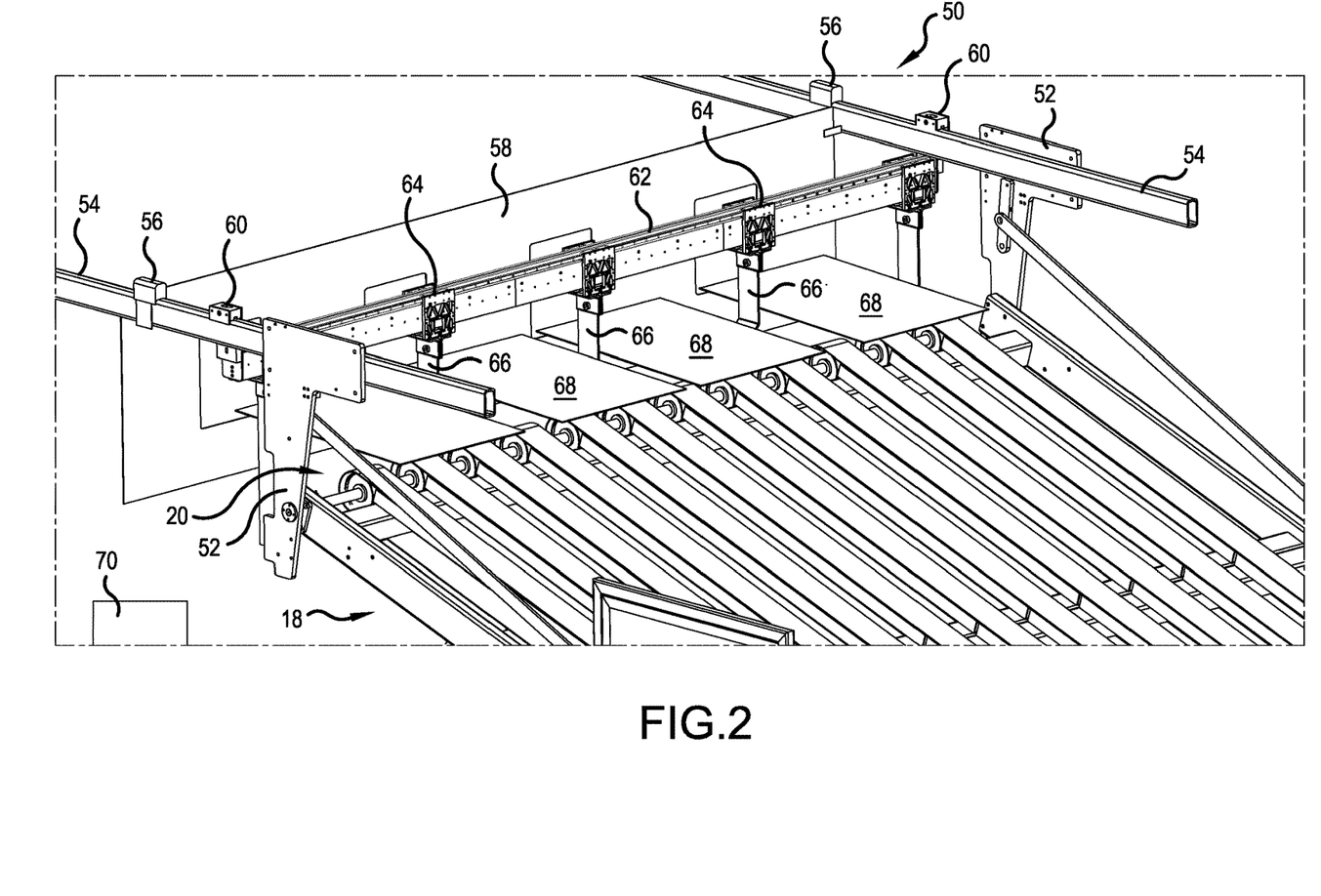
FIG. 2 is a perspective view of an accumulator according to an embodiment of the disclosure that includes a backstop and a tamping system.

Referring now to the drawings, wherein the showings are for the purpose of illustrating presently preferred embodiments of the disclosure only and not for the purpose of limiting same, FIG. 2 shows the downstream end 20 of the main conveyor 18 of a conventional stacking apparatus 10 that is equipped with an accumulator 50 according to the present disclosure.

The accumulator 50 includes first and second vertical side plates 52 at either side of the downstream end 20 of the main conveyor 18 and first and second parallel side guide rails 54 that are mounted on the vertical side plates 52. A backstop motor 56 is mounted on one or both of the first and second parallel side guide rails 54, and a backstop plate 58 is connected to the backstop motor 56. An intermediate motor 60 is mounted on one or both of the first and second side guide rails 54 at a location between the backstop motor 56 and the side plates 52, and an intermediate rail 62 is connected to the intermediate motor 60. A plurality of tamper linear motors 64 are mounted on the intermediate rail 62, and each tamper linear motor 64 supports a tamping plate 66.

The intermediate rail 62 is configured with magnets and/or sensors as is conventional for rail supports for linear motors. In other words, the linear motors 64 and the intermediate rail 62 themselves are conventional but are used in a novel manner in the present disclosure. Furthermore, while the present embodiment does not use linear motors for the backstop motor 56 or the intermediate motor 60, these motors and the rails that support them could be configured as linear motors without exceeding the scope of this disclosure.

Figure 3A:
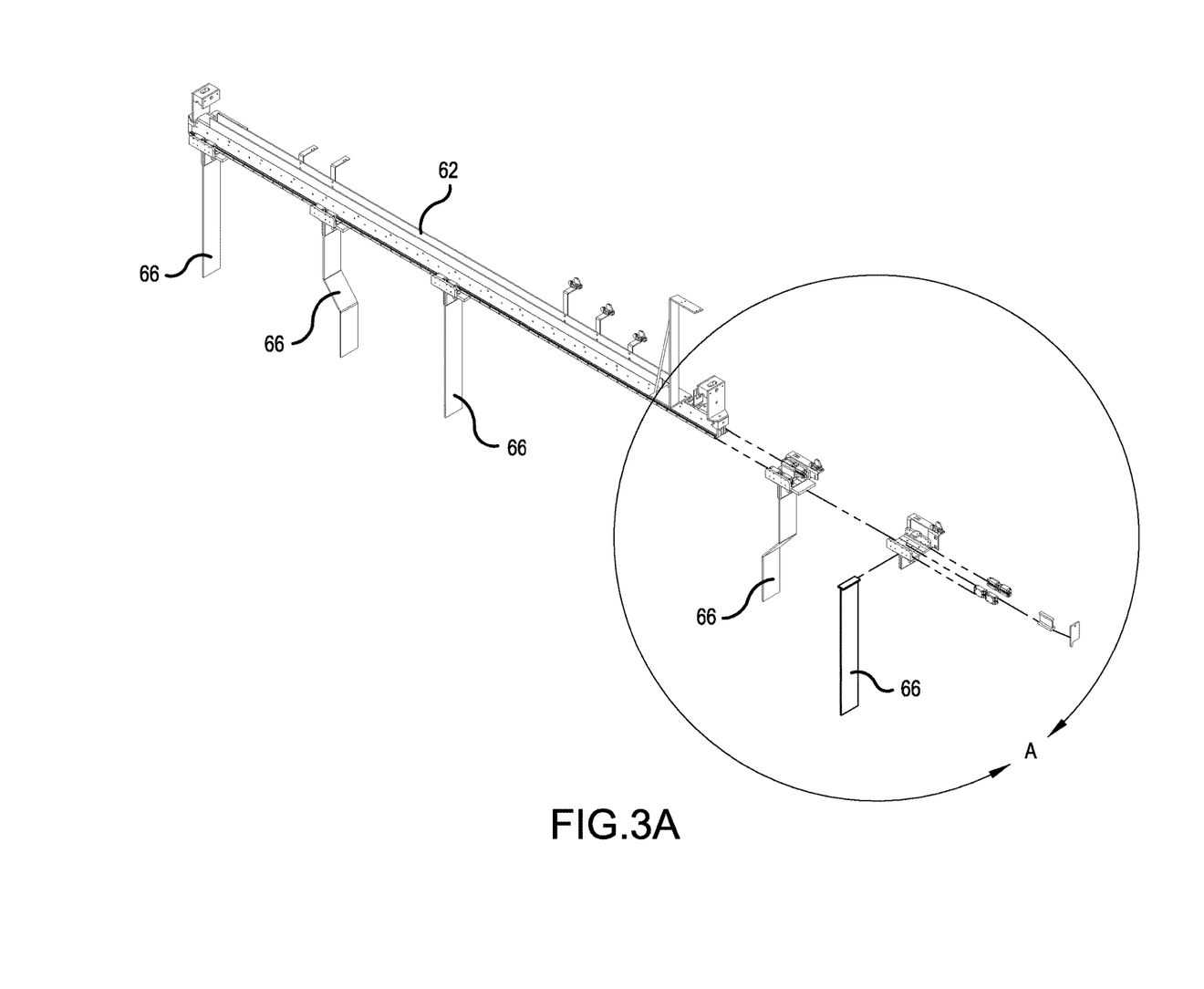
FIG. 3A is an exploded perspective view of a portion of the tamping system of FIG. 2.
Figure 3B:
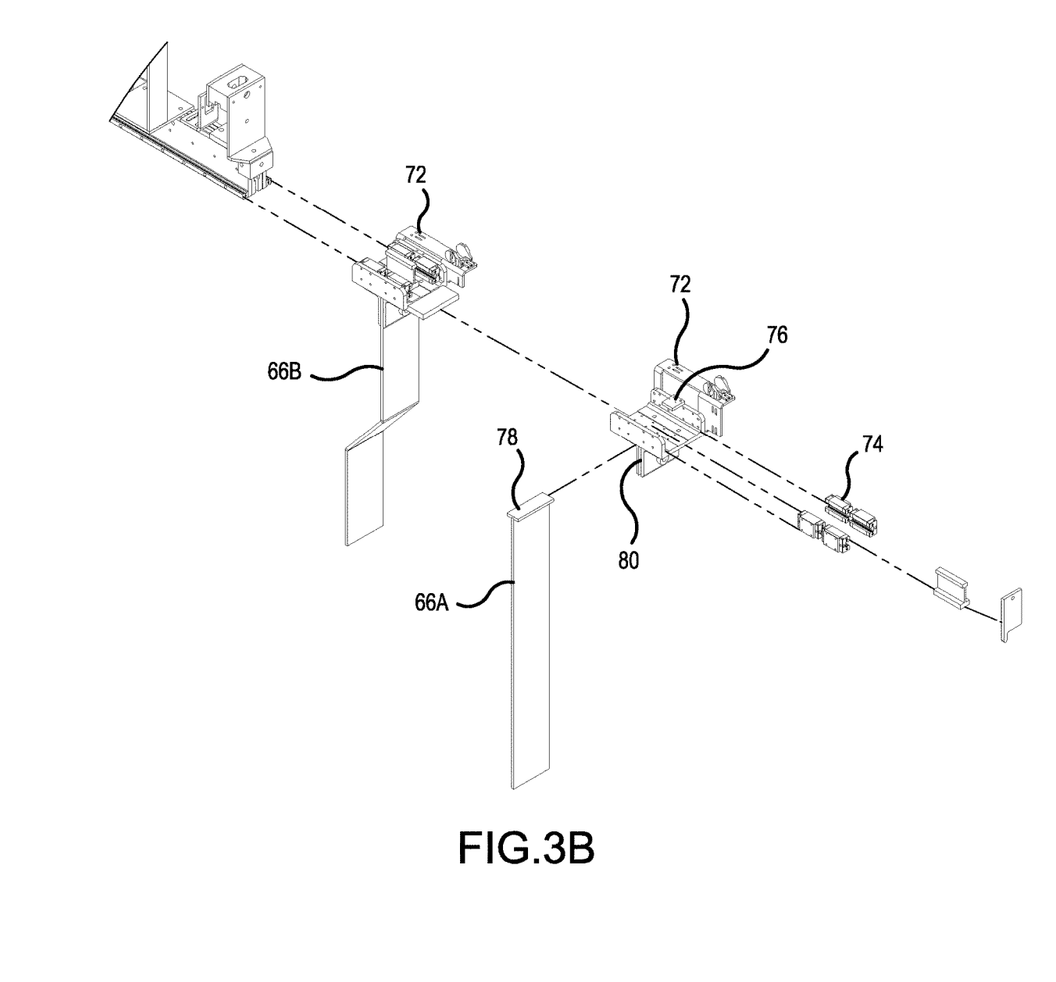
FIG. 3B is a detail view of circle A in FIG. 3A.

FIGS. 3A and 3B show the configuration of the intermediate rail 62 with the intermediate linear motors 64 removed for clarity. As will be appreciated from these Figures, the tamping plates 66 can be either linear, as illustrated by tamping plate 66A in FIG. 3B, or include an offset portion, as illustrated by tamping plate 66B in FIG. 3B. FIG. 3B also illustrates the brackets 72 which slidably support the intermediate linear motors 60 on the intermediate rail 62, which brackets include bearing blocks 74 and supports 76 for mounting the encoders (not illustrated) of the intermediate linear motors 60. Finally, it should be noted that the disclosed tamping plates 66A and 66B each include a top flange 78 by which they are slidably mounted in a corresponding T-shaped slot 80 in the brackets 72 so that tamping plates 66 having different shapes can be readily attached to and removed from the brackets 72 either for replacing a damaged tamping plate 66 or when it is desirable to use tamping plates having different configurations. The tamping plates 66 can be secured in the slots 80 by a friction fit or by the use of a suitable fastener (not illustrated).

In operation, a controller 70, which may be the main controller for the entire stacking system, controls the backstop motor 56 and the intermediate motor 60 and the tamper linear motors 64 and receives feedback from the magnets or other sensors on the intermediate rail 62 regarding the positions of the linear motors 64. The backstop motor 56 is controllable to place the backstop plate 58 in a desired position for a given production run of a product. The intermediate motor 60 is controlled to place the intermediate rail 62 in a position that is approximately half-way between the backstop plate 58 and the end 20 of the main conveyor 18. The tamper linear motors 64 are controlled to place the tamping plates 66 at desired positions, on the outer sides of and between incoming streams of sheets 68 as illustrated in FIG. 2. Then, during operation, the tamper linear motors 64 are controlled by the controller 70 to repeatedly move the tamping plates 66 laterally back and forth, in a direction perpendicular to the sheet travel direction, to perform a tamping operation. Thus, the backstop motor 56 and the intermediate motor 60 are used to move the backstop plate 58 and intermediate rail 62, respectively, into positions required for a given production run, and the tamper linear motors 64 move the tamping plates 66 into position and back and forth to perform a tamping operation.

The starting positions for the backstop motor 56 and the intermediate motor 60 and the linear motors 64 can be stored and recalled for different product runs. Therefore, instead of setting the positions of the backstop plate 58 and the intermediate rail 62 manually for each new production run, the respective motors can be controlled to move the backstop plate 58 and the intermediate rail 62 into predetermined positions appropriate for that production run by the controller 70. It may be necessary to set an initial position of the motors by hand or by driving the motors incrementally using the controller 70 to desired starting positions before saving those positions in a memory of the controller 70.

The following description illustrates an algorithm for setting up and operating a tamping system according to the present disclosure. The numeric values for the positions of the motors are unitless and could represent any unit of measurement or predefined locations along the guide rails for the linear motors.

An operator provides an input to the controller 70 to identify a particular configuration of the tamping system such as an identification of the size or product name of the product to transported by the stacking system. The controller 70 then retrieves values for the positions of each of the linear motors 64 from a memory. For example, the required position of the backstop plate 58 may be a location 100, and the controller 70 causes the backstop motor(s) 56 to simultaneously move along the side guide rails 54 to location 100 so that the backstop plate 58 is held at a predetermined distance from the downstream end 20 of the main conveyor 18. Next, the controller 70 sends a signal to the intermediate motors 60 to simultaneously move the intermediate motors 60 to a location 50 so that the intermediate rail 62 is moved to a desired starting position relative to the backstop plate 58 and relative to the downstream end 20 of the main conveyor 18. Next, the controller 70 sends signals to each of the tamper linear motors 64 to move the tamping plates 66 into desired positions. The controller 70 then controls the stacker to send parallel streams of sheets 68, in this case, four parallel streams, along the main conveyor 18 and into the accumulator 50 while the tamper linear motors 64 are driven repeatedly back and forth on the intermediate rail 62 to tamp the sheets as they form into stacks. Of course, the above steps can be performed in a different order or substantially simultaneously without exceeding the scope of the present disclosure.

When it is time to stack another product, one having a different length or a different number of streams of sheets, for example, a new accumulator configuration can be selected from memory and the accumulator can be set up in seconds instead of the minutes that this previously required.

Furthermore, the controller 70 is configured to maintain certain relationships between the positions of the various motors and linear motors to avoid collisions between system components. For example, the backstop motors 56 can never be located closer to the downstream end 20 of the main conveyor 18 than the intermediate motors 60, and the tamper linear motors 64 are also controlled so that they do not collide.

The present invention has been described above in terms of a presently preferred embodiment. Modifications and additions to this embodiment will become apparent to those of ordinary skill in the art upon a reading of the foregoing disclosure. It is intended that all such additions and modifications be included in the scope of the present application to the extent they fall within the scope of the several claims appended hereto.

What is claimed is:

1. A sheet stacking system comprising:
   a main conveyor configured to carry sheets in a downstream direction;
   an accumulator section downstream of the main conveyor configured to receive the sheets from the main conveyor;
   at least one tamping plate in the accumulator section; and
   at least one linear motor connected to the at least one tamping plate, the at least one linear motor being configured to move the at least one tamping plate back and forth in a direction perpendicular to the downstream direction to tamp a stack of the sheets in the accumulator section,
   wherein the accumulator section includes a backstop plate downstream of the at least one linear motor and a first side guide and a second side guide spaced from the first side guide in the direction perpendicular to the downstream direction, the at least one tamping plate being located between the main conveyor and the backstop plate and between the first side guide and the second side guide, and
   wherein the accumulator section includes a support rail extending transverse to the downstream direction and wherein the at least one linear motor is slidably mounted on the support rail.

2. The sheet stacking system according to claim 1, including a controller configured to control the at least one linear motor to move the at least one tamping plate in a predetermined manner.

3. The sheet stacking system according to claim 1, wherein the at least one linear motor, the at least one tamping plate and the backstop plate are supported by the main conveyor.

4. The sheet stacking system according to claim 1, wherein support rail is supported by the main conveyor.

5. A sheet stacking system comprising:
   a main conveyor having an input end and a discharge end, the main conveyor being configured to carry at least one row of sheets in a first direction from the input end to the discharge end and to discharge the at least one row of sheets from the discharge end to form at least one stack of sheets, the main conveyor further having a first side and a second side spaced from the first side in a second direction perpendicular to the first direction;
   an accumulator section downstream of the main conveyor discharge end, the accumulator section being configured to receive the at least one row of sheets on a support when the sheets are discharged from the discharge end of the main conveyor, the accumulator having a first side and a second side spaced from the first side in the second direction;
   a first side rail extending in the first direction along the first side of the accumulator section and a second side rail extending in the first direction along the second side of the accumulator section;
   an intermediate rail having a first end slidably supported by the first side rail and a second end slidably supported by the second side rail;
   a first linear motor mounted on the intermediate rail and being configured to travel along the intermediate rail in the second direction and in a third direction opposite the second direction;
   a first tamping plate depending from the first linear motor into the accumulator section; and a controller configured to move the first linear motor to a first predetermined position on the intermediate rail and to repeatedly move the first linear motor back and forth along the intermediate rail to cause the first tamping plate to perform a tamping operation on the at least one stack of sheets on the support in the accumulator section.

6. The sheet stacking system according to claim 5, further including:
a second linear motor mounted on the intermediate rail and being configured to travel along the rail in the second direction and the third direction; and
a second tamping plate depending from the second linear motor into the accumulator section,
wherein the controller is configured to move the second linear motor to a second predetermined position on the intermediate rail and to repeatedly move the second linear motor back and forth along the intermediate rail to cause the second tamping plate to perform a tamping operation on the at least one stack of sheets on the support in the accumulator section.

7. The sheet stacking system according to claim 6, wherein the first side rail is parallel to the second side rail.

8. The sheet stacking system according to claim 6, including a first drive operably connected to the intermediate rail for moving the intermediate rail along the first and second side rails toward and away from the discharge end of the main conveyor.

9. A method of controlling the sheet stacking system according to claim 6, comprising:
operating the main controller to convey the at least one row of sheets along the main conveyor toward the discharge end of the main conveyor and deposit the at least one row of sheets on the support in the accumulator section;
controlling the first and second linear motors to tamp the at least one stack of sheets.

10. The sheet stacking system according to claim 8, including a backstop plate slidably supported on the first and second side rails such that the intermediate rail is located between the backstop plate and the discharge end of the main conveyor.

11. The sheet stacking system according to claim 10, including a second drive operably connected to the backstop plate for moving the backstop plate along the first and second side rails toward and away from the discharge end of the main conveyor.

12. The sheet stacking system according to claim 11, including a first guide plate depending from the intermediate rail at the first side of the accumulator section and a second guide plate depending from the intermediate rail at the second side of the accumulator section and a third linear motor mounted on the intermediate rail, and a third tamping plate depending from the third linear motor into the accumulator section, wherein the first, second and third linear motors are mounted on the intermediate rail between the first and second guide plates.

13. The sheet stacking system according to claim 11, wherein the first side rail is connected to the main conveyor by a first support and the second side rail is connected to the main conveyor by a second support.

14. The sheet stacking system according to claim 12, wherein the first linear motor is located on the intermediate rail between the first guide plate and the second guide plate, wherein the second linear motor is located on the intermediate rail between the first linear motor and the second guide plate, wherein the third linear motor is located on the intermediate rail between the second linear motor and the second guide plate, and
wherein the controller is configured to control the first, second and third linear motors to tamp a first stack of the sheets between the first tamping plate and the first guide plate and to tamp a second stack of the sheets between the first tamping plate and the second tamping plate and to tamp a third stack of the sheets between the second tamping plate and the third tamping plate and to tamp a fourth stack of the sheets between the third tamping plate and the second guide plate.

15. The sheet stacking system according to claim 14, wherein the first guide plate is supported on the intermediate rail by a fourth linear motor and the second guide plate is supported on the intermediate rail by a fifth linear motor.

16. The sheet stacking system according to claim 5, wherein the first side rail is connected to the main conveyor by a first support and the second side rail is connected to the main conveyor by a second support.

17. The sheet stacking system according to claim 16, including a drive configured to raise and lower the discharge end of the main conveyor relative to the input end of the main conveyor.

18. A method of operating a sheet stacking system comprising:
a main conveyor having an input end and a discharge end, the main conveyor being configured to carry at least a first row of sheets and a second row of sheets in a first direction from the input end to the discharge end and to discharge the first and second rows of sheets from the discharge end, the main conveyor further having a first side and a second side spaced from the first side in a second direction perpendicular to the first direction;
an accumulator section downstream of the main conveyor discharge end, the accumulator section being configured to receive the first row of sheets in a first stack on a support and to receive the second row of sheets in a second stack on the support when the first and second rows of sheets are discharged from the discharge end of the main conveyor, the accumulator having a first side and a second side spaced from the first side in the second direction;
a first side rail extending in the first direction along the first side of the accumulator section and a second side rail extending in the first direction along the second side of the accumulator section;
an intermediate rail having a first end slidably supported by the first side rail and a second end slidably supported by the second side rail;
a first linear motor mounted on the intermediate rail and being configured to travel along the intermediate rail in the second direction and in a third direction opposite the second direction;
a second linear motor mounted on the intermediate rail and being configured to travel along the intermediate rail in the second direction and the third direction;
a first tamping plate depending from the first linear motor into the accumulator section; and
a second tamping plate depending from the second linear motor into the accumulator section;
a first drive operably connected to the intermediate rail for moving the intermediate rail along the first and second side rails toward and away from the discharge end of the main conveyor;

a backstop plate slidably supported on the first and second side rails such that the intermediate rail is located between the backstop plate and the discharge end of the main conveyor; and a second drive operably connected to the backstop plate for moving the backstop plate along the first and second side rails toward and away from the discharge end of the main conveyor, the method comprising:

controlling the second drive to position the backstop plate at a first predetermined position;

controlling the first drive to position the intermediate rail at a second predetermined position between the backstop plate and the discharge end of the main conveyor;

controlling the first linear motor and the second linear motor to position the first tamping plate and the second tamping plate such that the first row of sheets will pass between the first tamping plate and the second tamping plate when the first row of sheets enters the accumulator section; and controlling the first linear motor and the second linear motor to move the first tamping plate and the second tamping plate toward and away from each other to tamp the stack of sheets.

\* \* \* \* \*